(12) United States Patent
Ozawa et al.

(10) Patent No.: US 6,418,094 B1
(45) Date of Patent: Jul. 9, 2002

(54) OPTICAL PICK UP DEVICE

(75) Inventors: Takeshi Ozawa; Masayuki Ishikawa; Toru Kamada, all of Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/671,427

(22) Filed: Sep. 27, 2000

(30) Foreign Application Priority Data

Sep. 27, 1999 (JP) ............................................. 11-273145
May 26, 2000 (JP) ........................................ 2000-156069

(51) Int. Cl.⁷ ................................................. G11B 7/08
(52) U.S. Cl. ................................ 369/44.14; 369/44.17; 359/814
(58) Field of Search ......................... 369/44.11, 44.12, 369/44.14, 44.15, 44.16, 44.17, 44.18, 44.19, 44.27; 359/814, 824

(56) References Cited

U.S. PATENT DOCUMENTS 5,513,047 A * 4/1996 Matsui ................ 369/44.17 X

* cited by examiner

*Primary Examiner*—Muhammad Edun
(74) *Attorney, Agent, or Firm*—Sughrue Mion, PLLC

(57) ABSTRACT

An optical pick-up device includes a driven portion including an optical system having an objective lens, driving member including a focus coil for driving the driven portion in a direction of an optical axis, a tracking coil for driving in a direction orthogonal to the optical axis and a magnet, wherein the tracking coil is provided on a point symmetrically with respect to a central shaft and the magnet is provided in such a position that a magnetic flux is linked to one of two coil sides for generating driving force in a tracking direction.

6 Claims, 10 Drawing Sheets

FREQUENCY

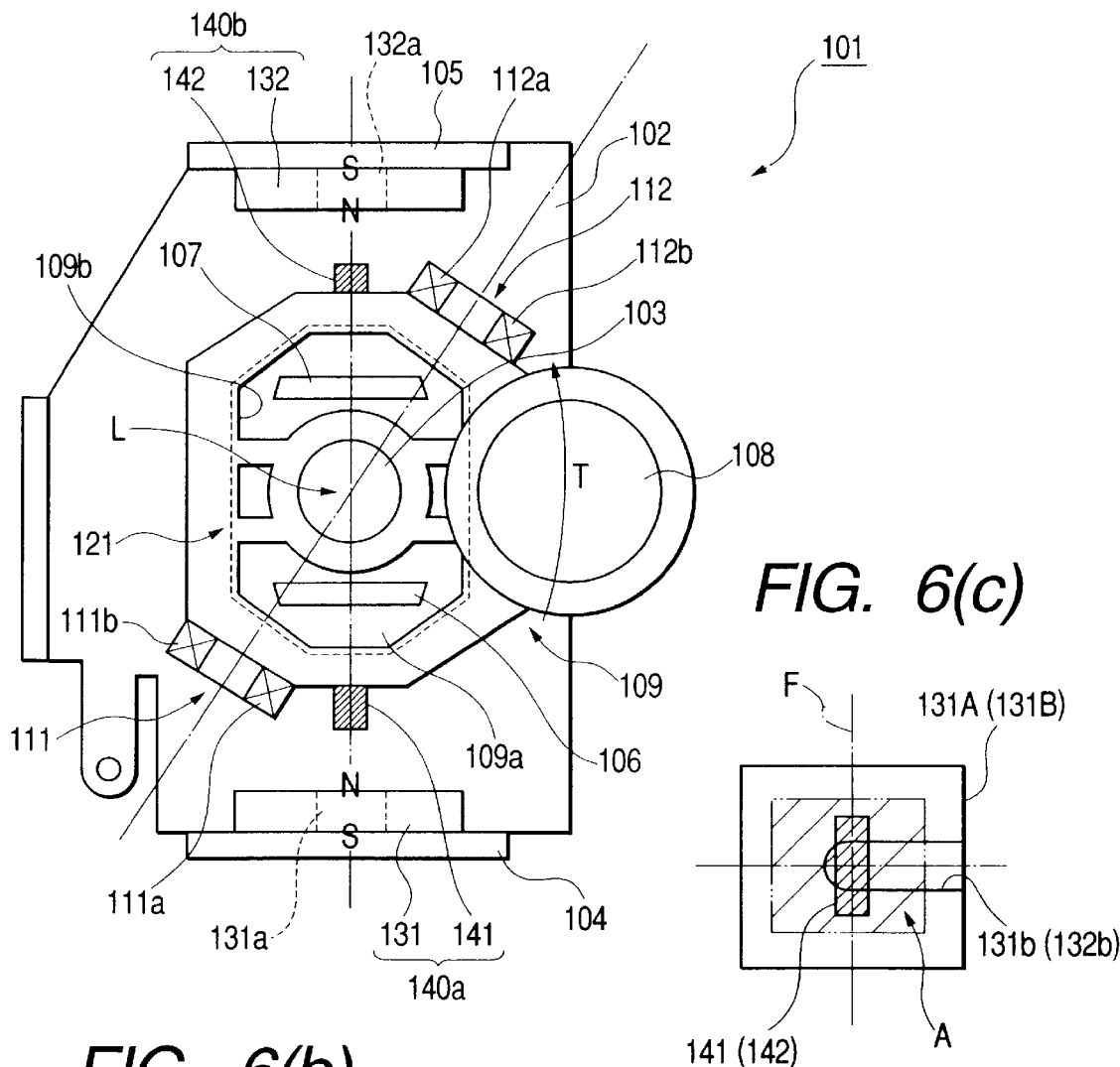
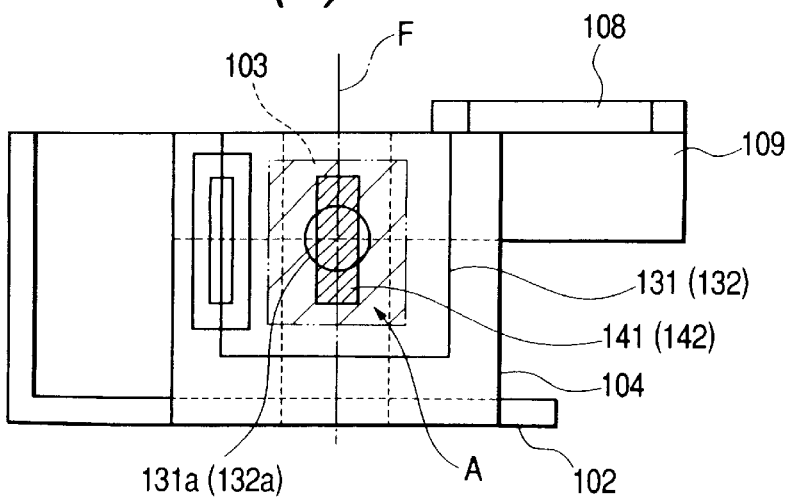

OPTICAL PICK UP DEVICE

BACKGROUND OF INVENTION

1. Field of Invention

The present invention relates to an optical pick-up device for reading and writing information from and to an optical disc such as a CD. More particularly, the invention relates to an improvement in arrangement of a tracking coil and a magnet in the optical pick-up device. Furthermore, the invention relates to an improvement in a magnetic spring for holding a lens holder having an objective lens in a magnetic neutral position.

2. Related Art

As shown in FIGS. 10 and 11, an optical pick-up device 900 comprises a driven portion 904 rotatably supported on a casing 901 around a central shaft 902 and including an optical system having an objective lens 903, a focus coil 905 and a tracking coil 906 which are attached to the driven portion 904, and a magnet 907 fixed to the casing 901 opposite to each tracking coil 906. A part of the casing 901 is provided as a yoke on the inside of the driven portion 904 and forms a parallel magnetic flux together with the magnet 907.

Furthermore, the tracking coil 906 is wound like a rectangle on the side surface of the driven portion 904 and is provided such that one side (hereinafter referred to as a driving side) 908 along the center 902 is positioned in the parallel magnetic flux. In consideration of a reduction in the size of the optical pick-up device 900, the tracking coils 906 are provided on the opposite side of the objective lens 903 with the central shaft 902 interposed therebetween.

In the optical pick-up device 900, the tracking coil 906 is conducted so that force for rotating the driven portion 904 is generated. Thus, a tracking operation can be carried out.

In the optical pick-up device, however, each tracking coil 906 is provided asymmetrically with respect to the central shaft 902. Therefore, when one of the tracking coils 906 approaches the magnet 907 during a tracking operation, the other tracking coil 906 goes away from the magnet 907. In other words, the tracking coils 906 have different positional relationships with the magnet 907 during the tracking operation, respectively. Consequently, the tracking coil 906 is varied on a magnetic circuit basis.

In addition, an opposite side 909 to be conducted in a reverse direction to the driving side 908 is sometimes affected by a magnetic field leakage from the magnet 907. For this reason, a phase disturbance is apt to be caused in a high-frequency region as shown in FIG. 12.

In the optical pick-up device 900, moreover, a magnetic spring for holding the driven portion 904 in the magnetic neutral position can be constituted by the magnet 907 and a magnetic piece 910 opposed to a region in which the magnetic field strength of the magnet 907 is changed.

The magnet 907 is magnetized uniformly. In general, therefore, it is necessary to provide the magnetic piece 910 in a position opposed to the outer peripheral edge of the magnet 907.

In many cases, however, the magnet has a large dimension and a space for attaching the magnetic piece cannot be kept in a position opposed to the outer peripheral edge. In particular, in the case in which the magnetic piece is to be provided on the outer peripheral edge of the magnet in a focusing direction, the magnetic piece should be provided in the position opposed to the outer peripheral edge of the magnet on the opposite side of an optical recording medium because there is no space on the optical recording medium side. As a result, the thickness of the optical pick-up device is determined depending on a dimension in the focusing direction occupied by the magnet and the magnetic piece opposed to the outer peripheral edge, which is not preferable for a reduction in the thickness of the device.

SUMMARY OF INVENTION

It is an object of the invention to provide an optical pick-up device which prevents a positional relationship with a magnet from being varied for each tracking coil during a tracking operation and prevents a side opposed to a driving side of the tracking coil from being affected by a magnetic field leakage.

It is another object of the invention to provide a magnetic spring for holding a lens holder in a magnetic neutral position without preventing a reduction in a thickness.

BRIEF DESCRIPTION OF DRAWINGS

FIGS. 6A and 6B are schematic plan and side views showing the optical pick-up device to which the invention is applied;

FIG. 6C is a schematic side view showing the position relationship magnet, magnet piece and notch;

DETAILED DESCRIPTION OF PREFERRED EMBODIMENTS

Figure 1:
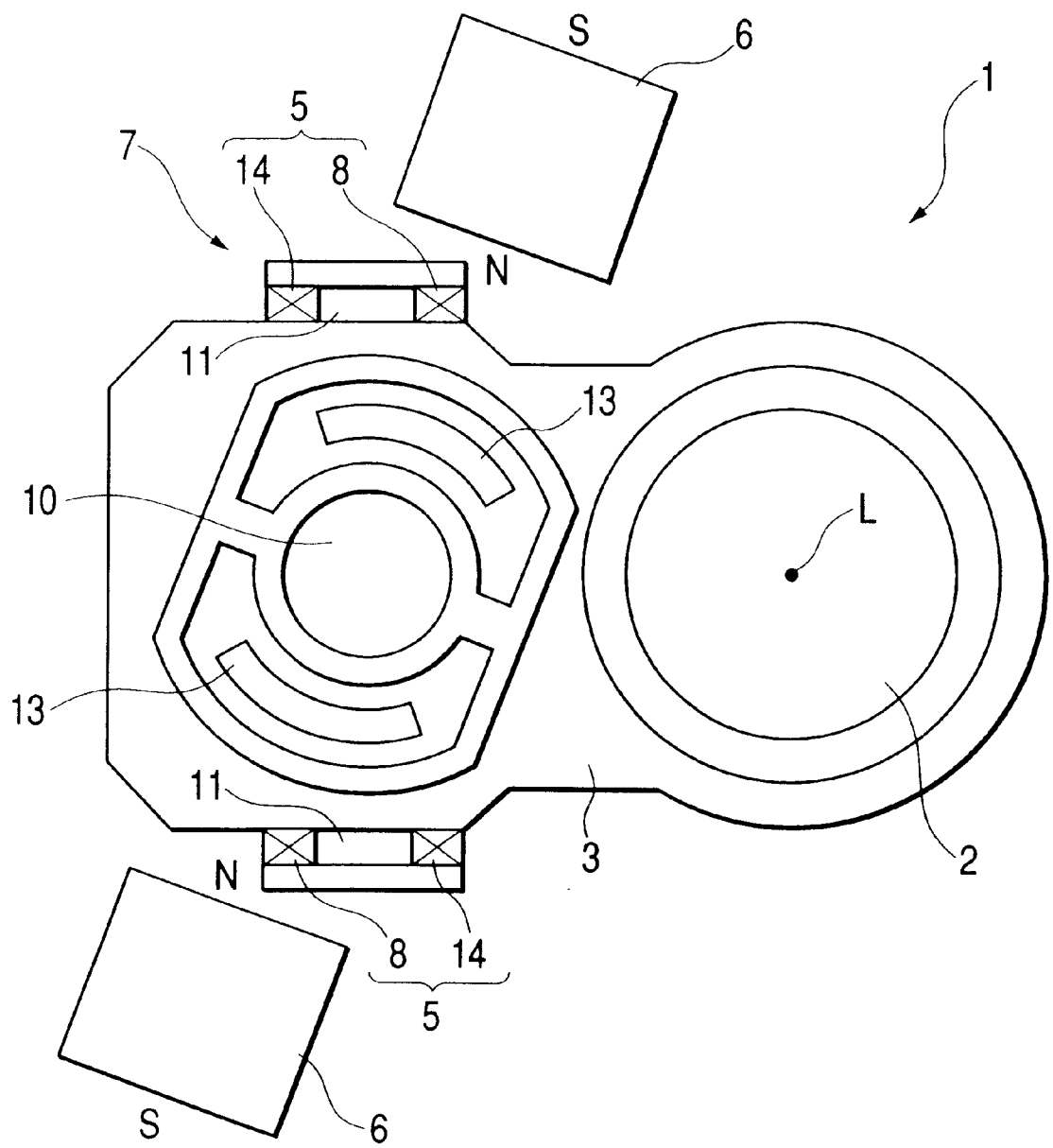
FIG. 1 is a plan view showing an optical pick-up device according to an embodiment of the invention.
Figure 2:
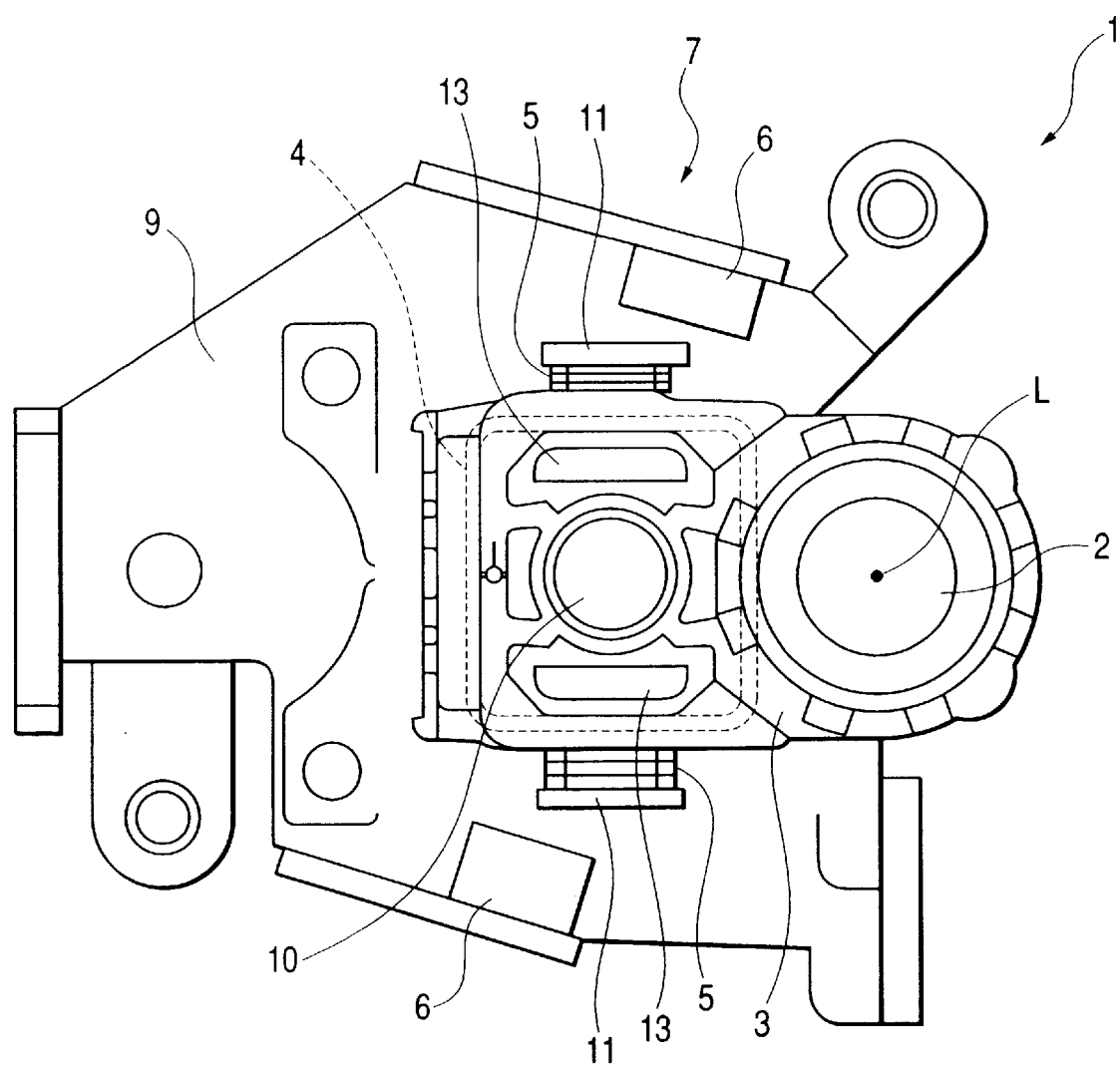
FIG. 2 is a plan view showing the optical pick-up device.
Figure 3:
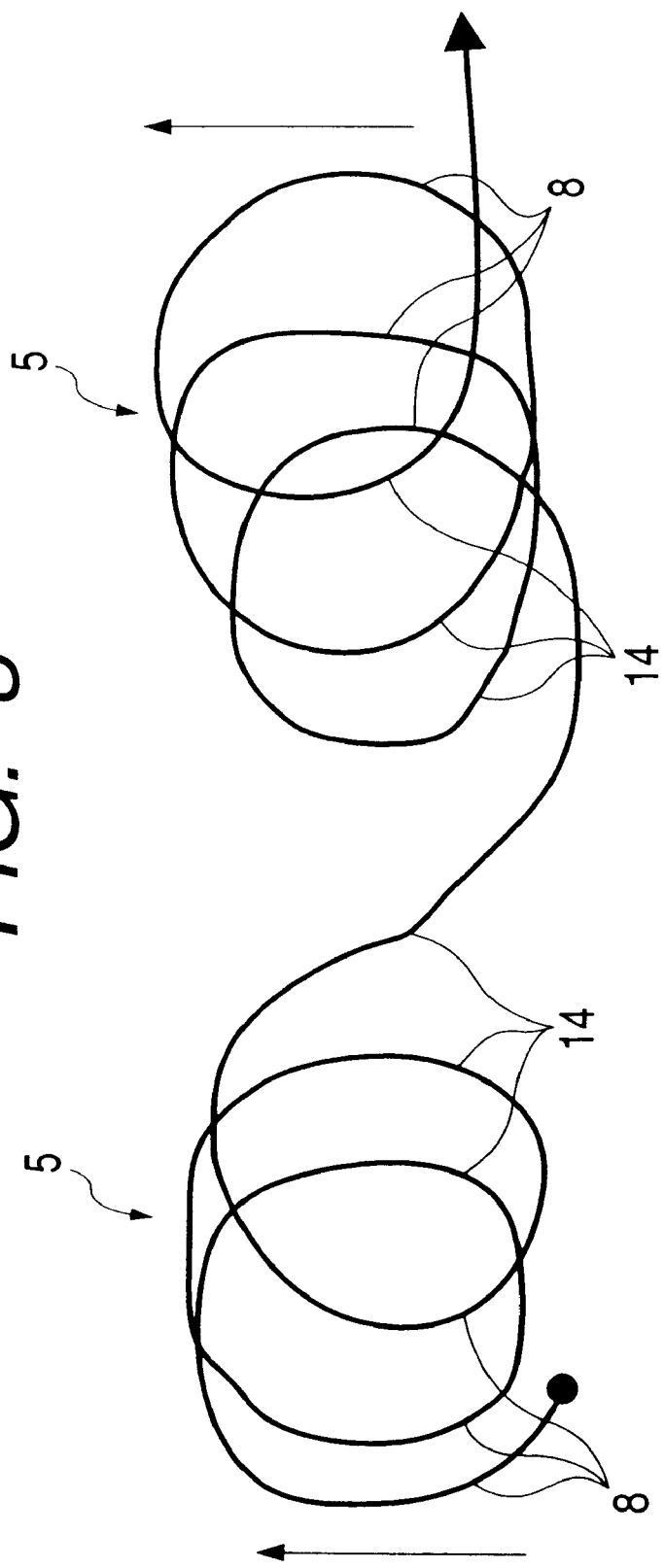
FIG. 3 is a schematic view showing a state in which a tracking coil is wound.

An example of a structure according to an embodiment of the invention will be described below in detail with reference to the drawings. FIGS. 1 to 3 show an optical pick-up device 1 according to the embodiment of the invention. The optical pick-up device 1 comprises a driven portion 3 including an optical system having an objective lens 2, and driving means 7 including a focus coil 4 for driving the driven portion 3 in a direction of an optical axis L, a tracking coil 5 for driving in a direction orthogonal to the optical axis L and a magnet 6. The tracking coil 5 is provided symmetrically with respect to a central shaft 10, and the magnet 6 is provided in a position where a magnetic flux is linked to only a coil side (hereinafter referred to as a driving side) 8 for generating driving force in a tracking direction. For this reason, the tracking coil 5 is provided symmetrically with respect to the central axis 10. Therefore, each tracking coil 5 carries out the same movement for the magnet 6 during the rotation of the driven portion 3. Consequently, each tracking coil 5 becomes equivalent on a magnetic circuit basis so that excessive force generated on the tracking coil 5 is mutually canceled. Thus, a stable angular moment can also be obtained in a high-frequency region. In addition, the tracking operation of the driven portion 3 can be well-balanced and can be carried out smoothly with high precision and a phase disturbance can be prevented from being caused. Moreover, the magnetic flux is linked to only the driving side 8. Therefore, a side other than the driving side, for example, an opposed side 14 to be conducted in a reverse direction to the driving side 8 can be prevented from affecting the tracking operation under the influence of a magnetic field leakage generated from the magnet 6.

The driven portion 3 is rotatably supported on a casing 9 with respect to the central shaft 10. A part of the casing 9 is provided as a yoke 13 on the inside of the driven portion 3 and forms a parallel magnetic flux together with the magnet 6.

The magnet 6 is provided diagonally to the tracking coil 5. More specifically, the magnet 6 is provided such that the magnetic flux is turned diagonally to a centerline of the tracking coil 5. Consequently, the direction of the magnetic flux can be orthogonal to a direction of rotation of the driven portion 3. Thus, the force generated on the conducted tracking coil 5 can be maximized and the efficiency of the tracking operation can be enhanced.

Moreover, the magnets 6 opposed to each other with the tracking coil 5 interposed therebetween have the same pole. Accordingly, the direction of the magnetic flux can be set point symmetrically with respect to the central shaft 10. Consequently, when the direction of conduction of the driving side 8 of the tracking coil 5 is set to be identical, the force generated on the driving side 8 of the tracking coil 5 can act in the same direction of rotation. Thus, excessive force generated on the tracking coil 5 is mutually canceled. Therefore, a stable angular moment can also be obtained in a high-frequency region.

The focus coil 4 and the tracking coil 5 are wound onto the driven portion 3. More specifically, two tracking coils 5 are wound onto a winding portion 11 formed in both side portions of the driven portion 3 with one wire in the same manner as one stroke of the pen as shown in FIG. 3. Consequently, the direction of the conduction of the driving side 8 of each tracking coil 5 can be set to be identical.

The optical pick-up device 1 is provided with two tracking coils 5 and 5. Therefore, the weight of the driven portion 3 can be reduced so that a fast follow-up property can be enhanced.

Moreover, the focus coil 4 is wound onto the driven portion 3 around a line parallel with the optical axis L. In the optical pick-up device 1, a magnet for a focus operation and a magnet for a tracking operation are shared. Therefore, the number of the magnets 6 to be installed can be decreased as much as possible so that the weight can be reduced.

In the embodiment, the coils 4 and 5 are directly wound onto the driven portion 3, which is not restricted. For example, a flexible printed circuit board having the coils 4 and 5 formed thereon, an etching coil or a separately assembled coil itself may be bonded to the driven portion 3.

A structure other than the arrangement of the tracking coil 5 and the magnet 6 in the optical pick-up device 1 is not particularly restricted but a well-known or novel structure can be employed.

The tracking operation of the optical pick-up device 1 will be described below. The driving means 7 is operated to conduct the tracking coil 5. Consequently, force is generated between the driving side 8 and a parallel magnetic field so that the driven portion 3 is rotated. Accordingly, the tracking operating can be carried out. Since the tracking coil 5 is provided symmetrically with respect to the central shaft 10, it carries out the same movement for the magnet 6. Therefore, excessive force generated on the tracking coil 5 is mutually canceled so that a stable angular moment can also be obtained in a high-frequency region. In addition, the opposed side 14 to be conducted in the reverse direction to the driving side 8 is not affected by the magnetic filed leakage. Therefore, a phase disturbance can be prevented from being generated in the high-frequency region. Furthermore, two tracking coils 5 are used to reduce the weight of a movable portion. Consequently, the fast follow-up property can be enhanced.

While the embodiment is one of the preferred examples of the invention, it is not restricted but can variously be changed without departing from the scope of the invention. For example, while the two tracking coils 5 are formed of one wire in the embodiment, they may be separately formed of two wires and be conducted respectively. Also in this case, the tracking coils 5 are provided point symmetrically so that a stable angular moment can also be obtained in the high-frequency region.

Figure 4:
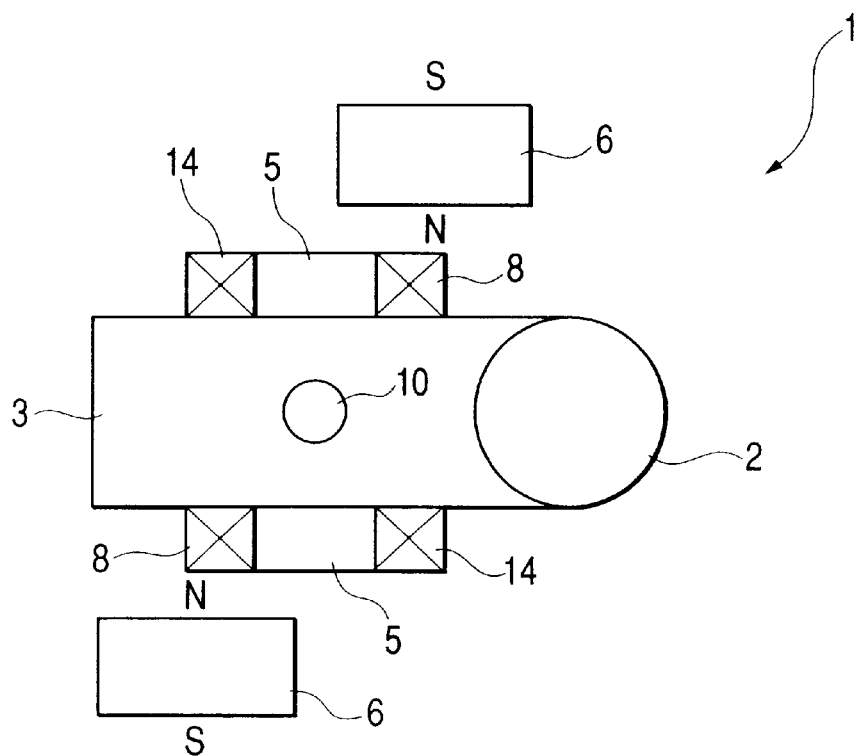
FIG. 4 is a plan view showing an optical pick-up device according to another embodiment.

Moreover, while each magnet 6 is provided diagonally to the tracking coil 5 in the embodiment, it may be arranged in parallel with the tracking coil 5 as shown in FIG. 4, for example. In other words, preferably, the magnet 6 is provided such that a magnetic flux is linked to only the driving side 8 of the tracking coil 5 and a direction thereof is not restricted. With such an arrangement of the magnet 6, the opposed side 14 of the tracking coil 5 is not affected by the magnetic field leakage. Consequently, it is possible to prevent a phase disturbance from being generated in the high-frequency region.

Furthermore, although the two tracking coils 5 are provided in the embodiment, the number of the tracking coils 5 may be three or more. In any case, the tracking coils 5 are arranged symmetrically with respect to the central shaft 10 and the magnet 6 is provided in the position where a magnetic flux is linked to only the driving side 8. Consequently, a stable angular moment is generated in the high-frequency region so that the generation of the phase disturbance can be prevented.

While the magnets 6 opposed to each other with the tracking coil 5 interposed therebetween have the same pole in the embodiment, they may have poles reverse to each other. In this case, the tracking operation can be carried out in the same manner by causing the direction of the conduction of the tracking coil 5 to be reverse to that in the embodiment.

Embodiment

EXAMPLE

By utilizing the optical pick-up device 1 according to the invention which has the tracking coils 5 provided symmetrically as shown in FIGS. 1 to 3, frequency characteristics of a phase difference and an S/N ratio were measured during a tracking operation. The result of the measurement is shown in FIG. 5.

Comparative Example

Figure 10:
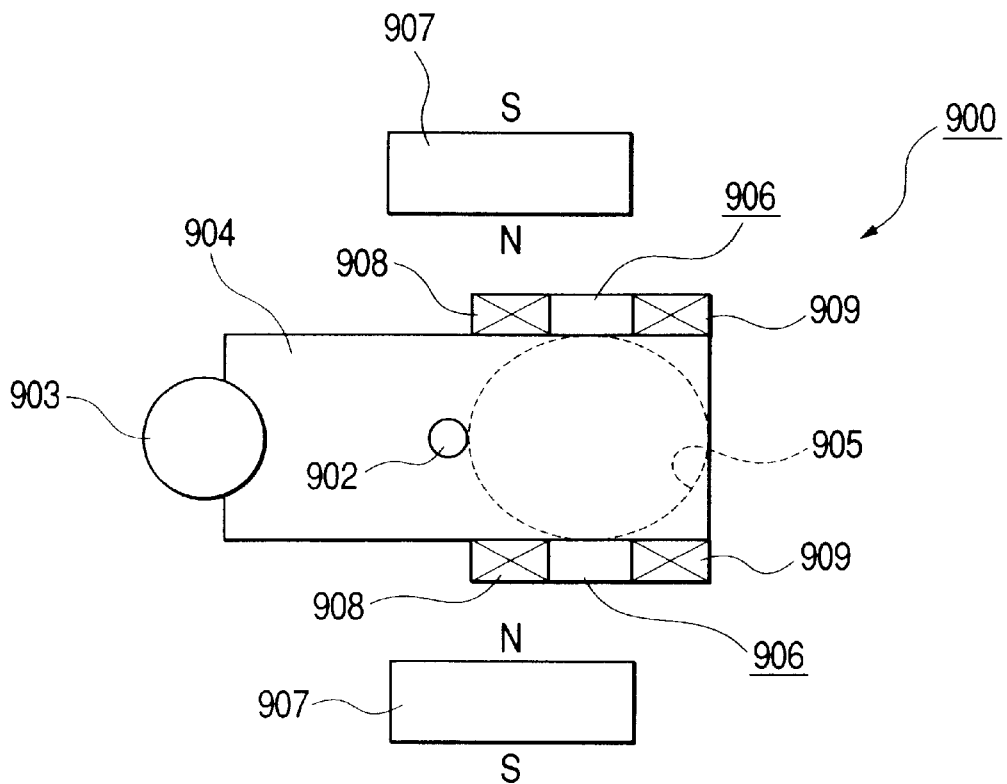
FIG. 10 is a plan view showing a conventional optical pick-up device.
Figure 11:
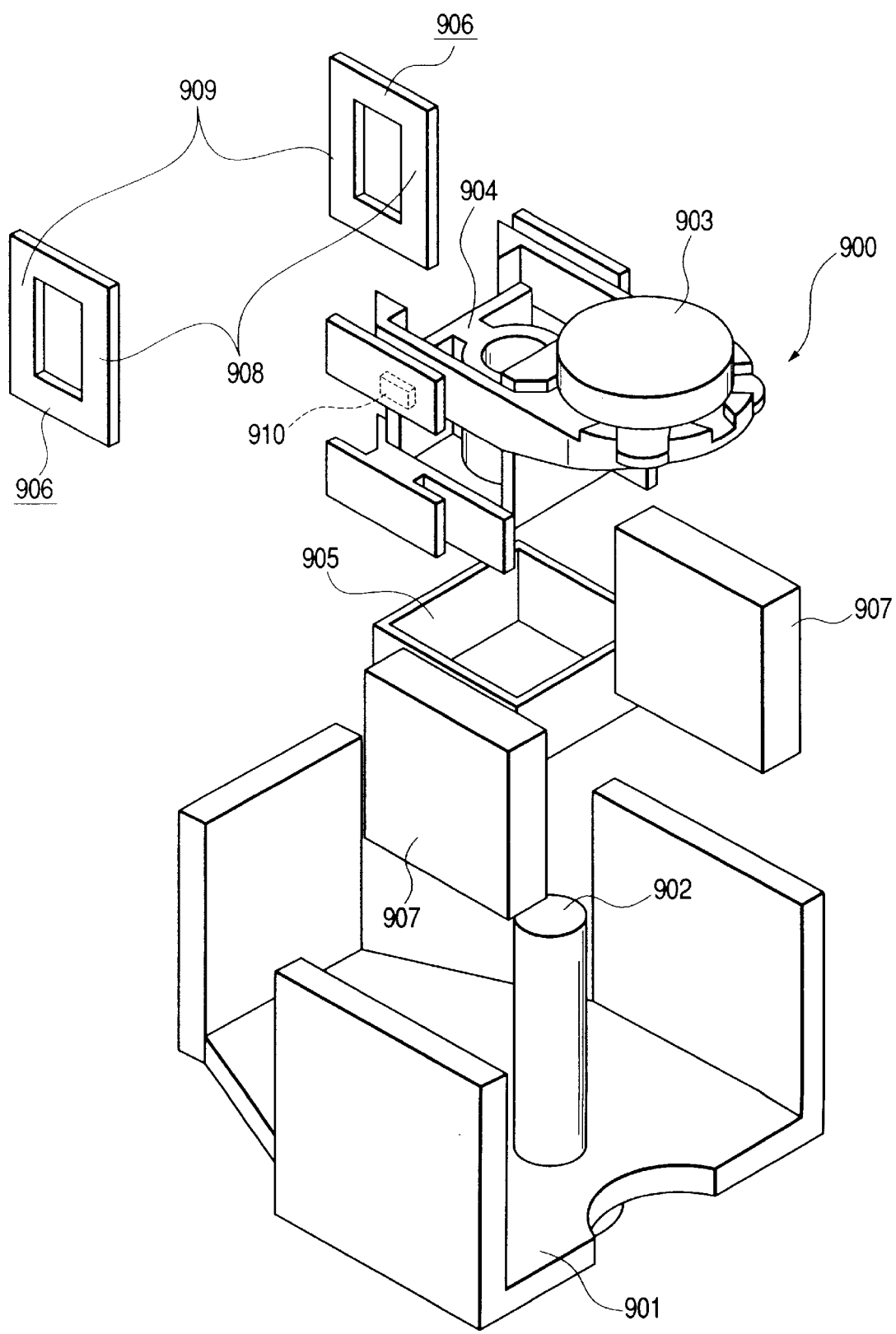
FIG. 11 is an exploded view showing the conventional optical pick-up device.

By utilizing the conventional optical pick-up device 900 having the tracking coils 906 provided symmetrically as shown in FIGS. 10 and 11, frequency characteristics of a phase difference and an S/N ratio were measured during the tracking operation. The result of the measurement is shown in FIG. 12.

Figure 5:
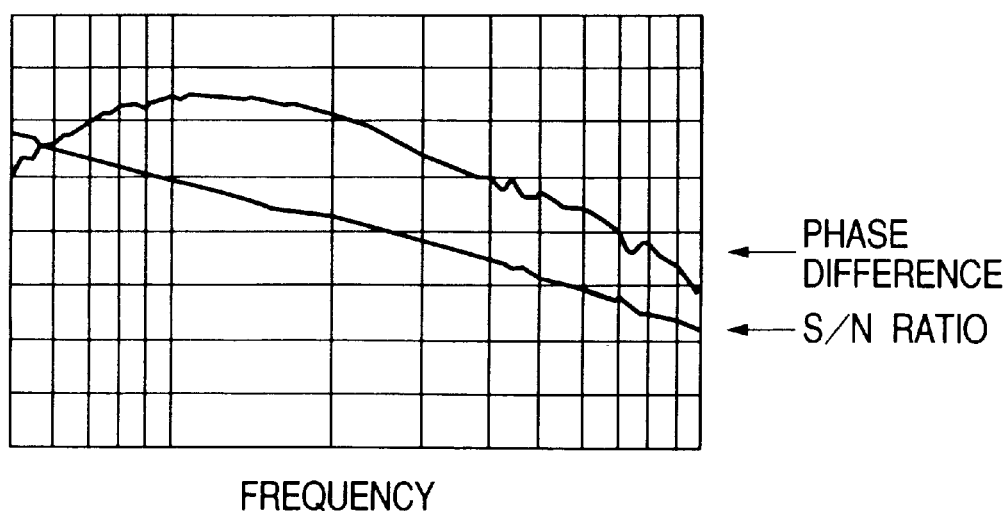
FIG. 5 is a graph showing frequency characteristics of a phase difference and an S/N ratio obtained during the tracking operation of the optical pick-up device.
Figure 12:
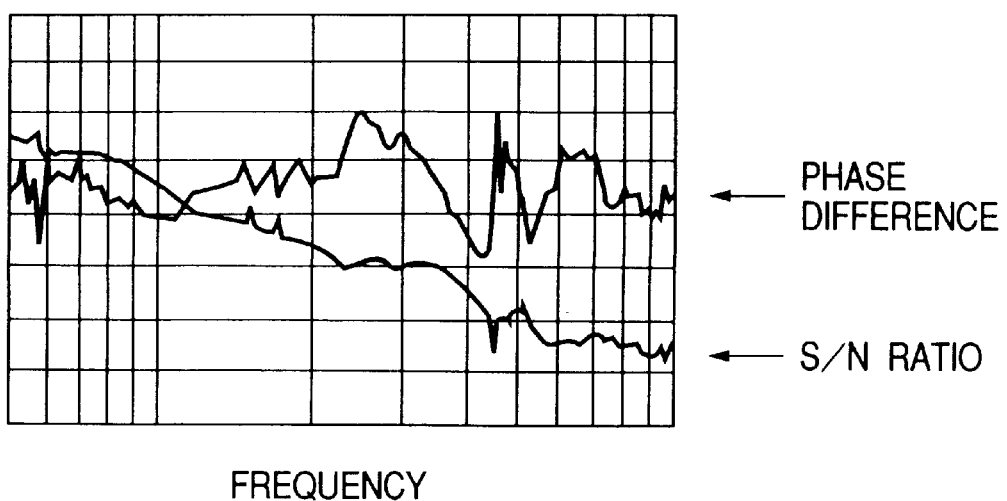
FIG. 12 is a graph showing frequency characteristics of a phase difference and an S/N ratio obtained during the tracking operation of the conventional optical pick-up device.

As is apparent from a comparison between FIGS. 5 and 12, if the tracking coils 5 provided symmetrically are utilized, an oscillation could be more suppressed particularly in a high-frequency region than the case in which the tracking coils 906 provided asymmetrically are utilized. According to the optical pick-up device 1 of the invention, it has been found that the generation of a phase disturbance can be prevented in the high-frequency region during the tracking operation.

Next, an improvement in a magnetic spring in the optical pick-up device according to an embodiment to which the invention is applied will be described with reference to the drawings.

Figure 7:
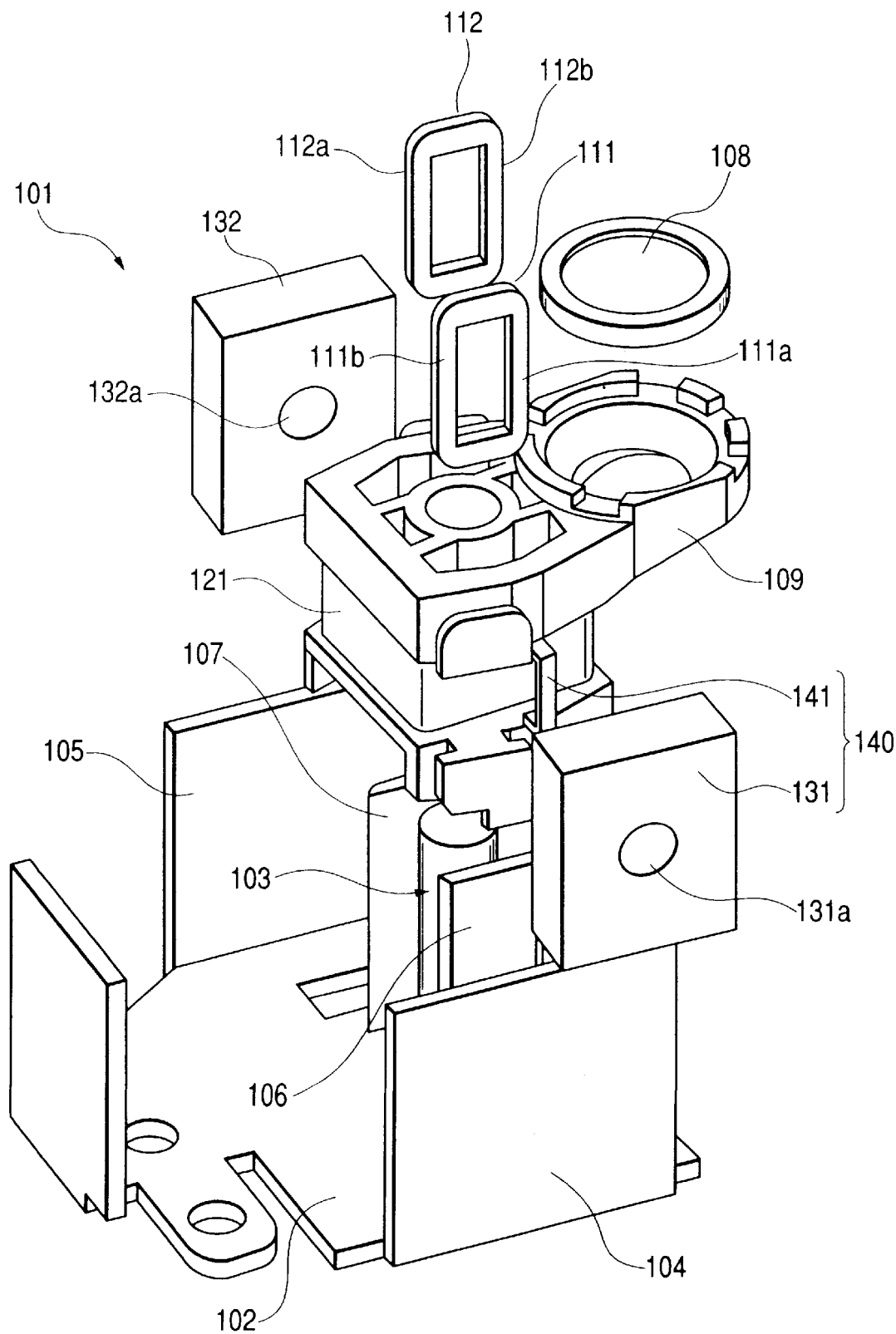
FIG. 7 is an exploded perspective view showing the optical pick-up device illustrated in FIG. 6.

FIGS. 6A and 6B are schematic plan and side views showing the optical pick-up device according to the embodiment and FIG. 7 is an exploded perspective view. An optical pick-up device 101 according to the embodiment is of a shaft sliding rotation type in which a magnetic driving mechanism for driving an objective lens in a tracking direction and a focusing direction is incorporated.

In more detail, the optical pick-up device 101 according to the embodiment comprises a casing 102 having a central shaft (sliding shaft) 103 erected vertically on the center thereof. A pair of outer yokes 104 and 105 are formed by vertically erecting a part of the casing in a point symmetrical in position with the central shaft (sliding shaft) 103 interposed therebetween. Moreover, a pair of inner yokes 106 and 107 are formed by vertically erecting a part of the casing in the point symmetrical in position with the central shaft (sliding shaft) 103 interposed therebetween ion the inside of the outer yokes 104 and 105.

A lens holder 109 acting as a driven portion holding the objective lens 108 is supported on the central shaft (sliding shaft) 103 slidably in a direction of a sliding axis F (focusing direction) and rotatably in a rotating direction T (tracking direction) around the axis F. The lens holder 109 is provided with through holes 109a and 109b through which the inner yokes 106 and 107 penetrate.

The magnetic driving mechanism includes a pair of tracking coils 111 and 112 attached to the outer peripheral surface of the lens holder 109 acting as the driven portion, a focusing coil 121 fixed to the lens holder 109, and a pair of magnets 131 and 132 to be used for both tracking and focusing which are attached to the casing side. The tracking coils 111 and 112 are bonded and fixed to a pair of coil attachment surfaces 109c and 109d formed on the outer peripheral surface of the lens holder 109 in positions which are symmetrical with respect to the axis F, that is, a rotation centerline L of the lens holder. The focusing coil 121 is attached to the lens holder 109 in such a state as to surround the inner yokes 106 and 107. A pair of magnets 131 and 132 are bonded and fixed to the inner side surfaces of the outer yokes 104 and 105 in positions which are at a point symmetrical with respect to the rotation centerline L.

The tracking coils 111 and 112 and the corresponding magnets 131 and 132 have the following relative positional relationships. More specifically, the arrangement relationships are determined such that magnetic fluxes generated from the magnets 131 and 132 are linked to only first winding portions 111a and 112a in the first winding portions 111a and 112a and second winding portions 111b and 112b having winding directions inverted from each other by 180 degrees in the tracking coils 111 and 112.

The optical pick-up device 101 according to the embodiment incorporates a magnetic springs 140a and 140b for holding the objective lens 108 mounted on the lens holder 109 acting as the driven portion in a magnetic neutral position. The magnetic spring 140a according to the embodiment is constituted by the magnet 131 and a magnetic piece 141 attached to the lens holder 109. As same as the magnetic spring 140a, the magnetic spring 140b according to the embodiment is constituted by the magnet 132 and a magnetic piece 142 attached to the lens holder 109. In the magnets 131 and 132 according to the embodiment, a rectangular magnetic material having a constant thickness is uniformly magnetized so that one of magnetic poles, for example, an N pole is formed on an internal side surface opposed to the tracking coils 111 and 112 and the other magnetic pole, for example, an S pole is formed on the other external side surface.

Moreover, circular through holes 131a and 132a are opened on the center of the magnets 131 and 132, respectively. The circular through holes 131a and 132a are formed so that the magnets 131 and 132 have a magnetic field change portion within an area A, respectively, which is defined by a region, which is projected on the magnets 131 and 132, reflecting the movable area of magnetic pieces 141 and 142. The magnetic field change portion in which a magnetic field strength is changed is formed in a region A of the magnet facing the magnetic piece 141 (a region shown in a cross hatching of FIG. 6B). In the magnetic piece 142, as the same as FIG. 6 (b), it has a region as same as shown in FIG. 6(b). The magnetic piece 141 (142) is provided in a position opposed to the portion thus formed in which the magnetic field strength is changed most greatly. In the embodiment, the magnetic piece 141 is provided in a position opposed to the circular through hole 131a(132a).

In the optical pick-up device 101 having such a structure according to the embodiment, the tracking coils 111 and 112 are provided symmetrically with respect to the axis F. Similarly, the magnets 131 and 132 are also provided symmetrically. Accordingly, the relative positional relationship between the tracking coil 111 and the magnet 131 and that between the tracking coil 112 and the magnet 132 are mutually held in the same state also in the case in which the lens holder 109 is rotated in the tracking direction. Moreover, magnetic fluxes generated from the magnets 131 and 132 are linked to only the winding portions 111a and 112a of the tracking coils 111 and 112.

As a result, excessive force generated on each of the tracking coils 111 and 112 is mutually canceled during the rotation of the lens holder 109 acting as the driven portion. Therefore, a stable angular moment can also be obtained in the high-frequency region. Furthermore, the winding portions 111b and 112b having reverse conducting directions in the tracking coils 111 and 112 are not affected by the magnetic field leakage from the magnets 131 and 132. Therefore, a phase disturbance can also be prevented in the high-frequency region.

In addition, in the magnetic spring 140a and 140b of the optical pick-up device 101 according to the embodiment, a portion in which a magnetic field strength is changed is formed in the region A projected on the magnets 131 and 132 and the magnetic pieces 141 and 142 are positioned opposite to a portion in which the change is carried out most sharply. Accordingly, it is not necessary to oppose the magnetic pieces 141 and 142 to the outer peripheral edge portion of the magnets 131 and 132. Therefore, a space for installing the magnetic piece is not required in the portion opposed to the outer peripheral edge of the magnets 131 and 132 in the lens holder 109. In particular, it is possible to avoid a bad influence that a dimension of the device is increased as in the case in which the magnetic piece is provided on upper and lower outer peripheral edges positioned in the focusing direction F of the magnets 131 and 132.

In this embodiment, the magnetic springs 140a and 140b are arranged at both sides so that an urging force is uniformly effected in right and left sides, and upper and lower sides in FIG. 1. Therefore, there is prevented the phase turbulence due to the operation. Of course, although the single magnetic spring is employed, the effect thereof could be enjoyed.

Figure 8:
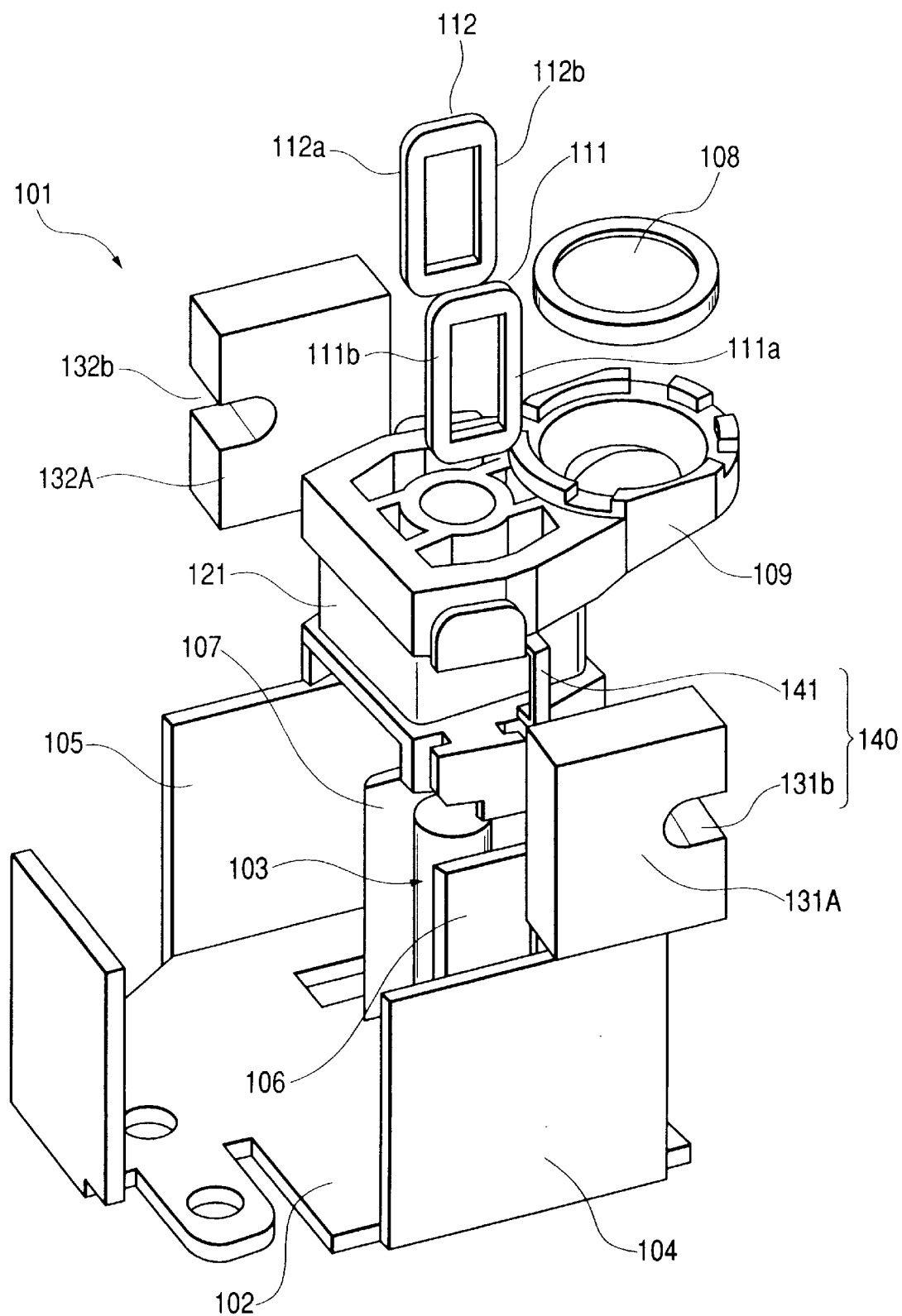
FIG. 8 is an exploded perspective view showing a variant of the optical pick-up device illustrated in FIG. 6.

In order to change the magnetic filed strength in the region A of the magnets 131 and 132, notches 131b and 132b cut circularly in a transverse direction may be formed in the middle position in the focusing direction as in magnets 131A and 132A shown in FIGS. 6(c) and 8 instead of forming a through hole. In this case, the magnets 132A and 132B serving as a common part may be provided symmetrically with respect to the axis F.

On the other hand, it is possible to change the magnetic field strength in the region A projected on the magnet even if the degree of magnetization is partially varied instead of uniformly magnetizing the magnets 131 and 132.

Figure 9A:
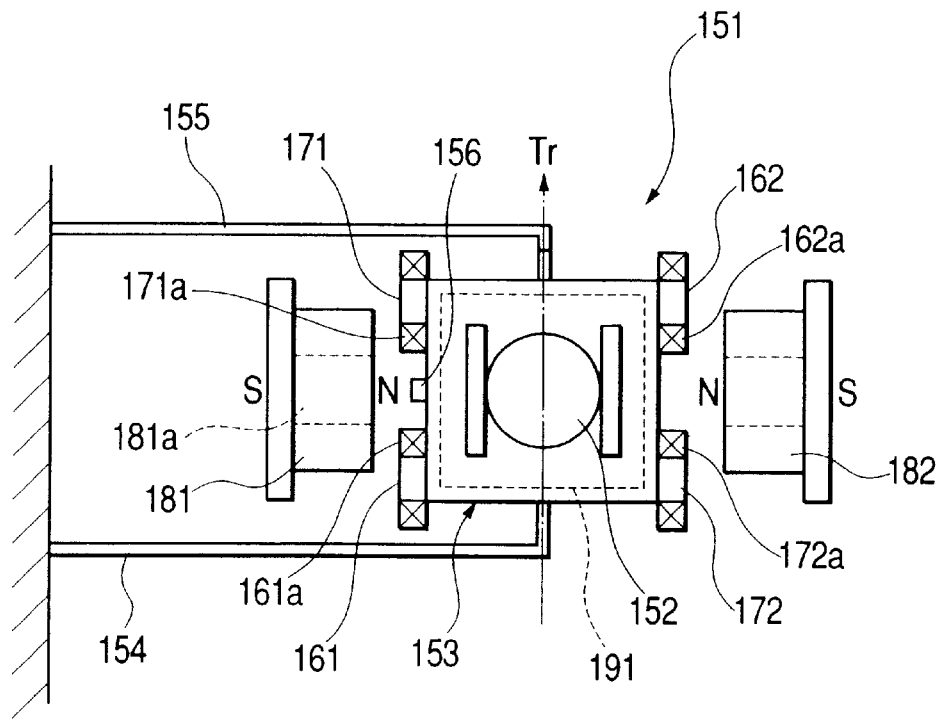
FIGS. 9A and 9B are schematic plan and side views showing another example of the optical pick-up device to which the invention is applied.
Figure 9B:
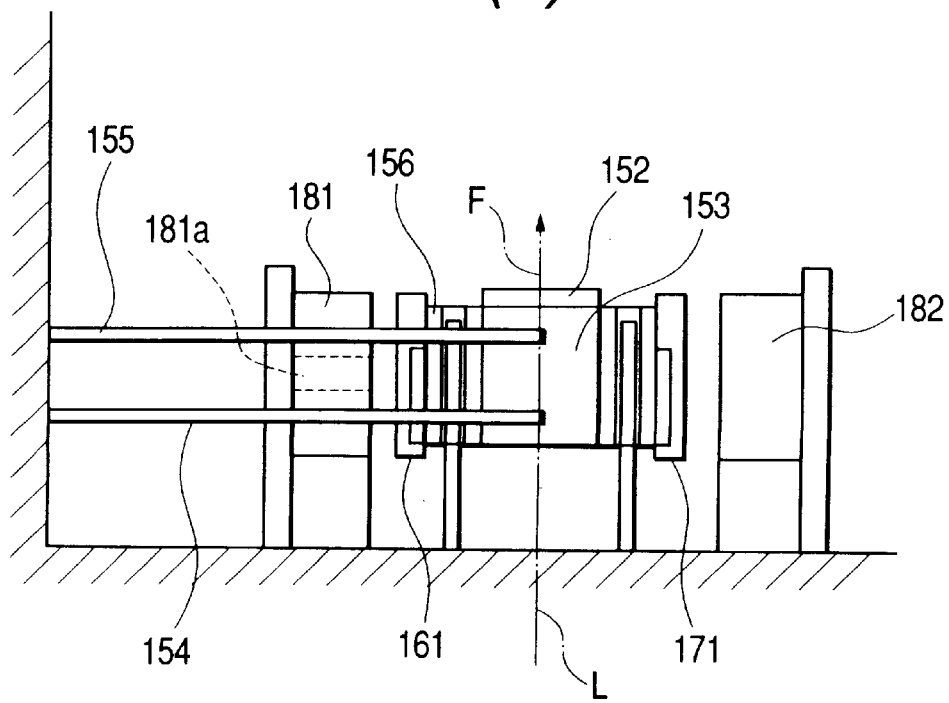

FIGS. 9A and 9B show an optical pick-up device of a wire suspension type to which the invention is applied. In an optical pick-up device 151 shown in the drawings, a lens holder 153 holding an objective lens 152 and acting as a driven portion is movably supported on a pair of right and left wire suspensions 154 and 155 in a focusing direction F and a tracking direction T. A magnetic driving mechanism for driving the lens holder 153 in the tracking direction and the focusing direction is constituted by two pairs of tracking coils 161 and 162 and 171 and 172, a pair of magnets 181 and 182 to be used for both tracking and focusing, and a focusing coil 191.

Also in this case, the tracking coils 161 and 162 are provided in positions which are symmetrical with respect to a rotation centerline in the tracking direction of the lens holder 153, and the tracking coils 171 and 172 are also provided symmetrically. Furthermore, the magnets 181 and 182 are also provided symmetrically. In addition, an arrangement relationship is determined such that the magnetic fluxes of the magnets 181 and 182 are linked to only each of winding portions 161a and 171a on one of the sides of each of the tracking coils 161 and 171. Similarly, an arrangement relationship is determined such that the magnetic fluxes of the magnets 181 and 182 are linked to only each of winding portions 162a and 172a on one of the sides of each of the tracking coils 162 and 172.

A magnetic spring is constituted by the magnet 181 and a magnetic piece 156 attached to the lens holder 153. Also in the embodiment, a through hole 181a is opened on the center of the magnet 181 and a portion in which a magnetic field strength is changed is formed. The magnetic piece 156 is provided in a position opposed to a portion in which the change is carried out most sharply.

By the optical pick-up device 151 having such a structure according to the embodiment, similarly, it is possible to obtain the same functions and effects as those of the optical pick-up device 101 shown in FIGS. 6 and 7.

The magnetic field changing portion corresponds to the through hole or notch in this embodiment described above. However, the present invention is not limited by this embodiment. The portion has a function, that is, the magnetic field is changed. For example, it is applicable for obtaining a convex portion on the magnet. Further, the size and shape of a through hole or a notch are not limited by this embodiment. If the magnetic field is changed, no limitation is applied to the size and shape thereof.

As is apparent from the above description, according to the optical pick-up device of the invention, the tracking coils are provided symmetrically with respect to the central shaft. Therefore, each tracking coil carries out the same movement for the magnet during the rotation of the driven portion. Consequently, the tracking coils become identical on a magnetic circuit basis so that excessive force generated from the tracking coil is mutually canceled. Thus, a stable angular moment can also be obtained in the high-frequency region.

Moreover, a magnetic flux is linked to one coil side (driving side) for generating driving force in the tracking direction. Therefore, it is possible to prevent the side other than the driving side from affecting the tracking operation under the influence of the magnetic field leakage from the magnet. Consequently, a phase disturbance can be prevented from being generated in the high-frequency region during the tracking operation of the optical pick-up device.

According to the optical pick-up device of the invention, furthermore, the direction of the magnetic flux can be orthogonal to the rotating direction of the driven portion. Therefore, the force generated on the conducted tracking coil can be maximized so that the efficiency of the tracking coil can be enhanced.

According to the optical pick-up device of the invention, moreover, the direction of the magnetic flux can be symmetrical. Therefore, when the conducting directions of the driving sides of the tracking coils are set to be identical, the force generated on each tracking coil acts in the same rotating direction so that the driven portion can be rotated.

According to the optical pick-up device of the invention, furthermore, the number of the tracking coils can be minimized so that the weight of the movable portion can be reduced. Therefore, a fast follow-up property can be enhanced. Consequently, it is possible to take countermeasures for a recent increase in a speed at which information is read from and written to an optical disc.

According to the invention, in the optical pick-up device having such a structure that the magnet and the tracking coil are arranged symmetrically with respect to the rotation centerline in the tracking direction of the lens holder and the magnetic flux of the magnet is linked to the winding portion in which the winding direction in the tracking coil is turned toward one way, the magnetic spring for holding the lens holder in the magnetic neutral position is constituted by the magnet and the magnetic piece and the magnet, the portion in which a magnetic field strength is changed is formed in the region, which is projected on the magnet, reflecting the movable area of magnetic pieces, and the magnetic piece is provided opposite to the changing portion.

According to the invention, therefore, the space for installing the magnetic piece can be kept more easily and the thickness of the device can be reduced much more advantageously than in the case in which the magnetic piece is provided opposite to the outer peripheral edge of the magnet to constitute the magnetic spring. Moreover, the magnetic circuit between the magnet and the magnetic piece can be designed readily. Therefore, the shape of the magnetic piece can be selected easily and the magnetic piece can be installed simply.

What is claimed is:

1. An optical pick-up device comprising:
   a driven portion including an optical system having an objective lens;
   driving member including:
      a focus coil for driving the driven portion in a direction of an optical axis;
      a tracking coil for driving in a direction orthogonal to the optical axis; and
      a magnet;
   wherein the tracking coil is provided on a point symmetrically with respect to a central shaft and the magnet is provided in such a position that a magnetic flux is linked to one of two coil sides for generating driving force in a tracking direction,
   wherein the magnet is provided diagonally to the tracking coil.

2. The optical pick-up device according to claim 1, wherein the magnets, opposed to each other through the tracking coil, have the same pole.

3. The optical pick-up device according to claim 1 or 2, the tracking coil employs at least two.

4. An optical pick-up device comprising:
   a lens holder for holding an objective lens;
   a magnetic driving mechanism for moving the lens holder in a tracking direction and a focusing direction, the magnetic driving mechanism includes a pair of tracking coils, a focusing coil and a pair of magnets for forming a magnetic circuit together with the tracking coil and the focusing coil; and
   a magnetic spring for holding the lens holder in a magnetic neutral position,
   wherein, the tracking coils and the magnets are provided on a point symmetrically with respect to a rotation centerline in the tracking direction of the lens holder respectively and relative positions of the magnet and the tracking coil being determined such that a magnetic flux generated from the magnet is linked to one of a first winding portion and a second winding portion having winding directions in the tracking coil inverted mutually by 180 degrees, and the magnetic spring is defined by a magnetic piece and the magnet opposed to the magnetic piece and a portion in which a magnetic field strength is changed is formed in a region, which is projected on the magnet, reflecting the movable area of magnetic pieces, and the magnetic piece is opposed to the portion.

5. The optical pick-up device according to claim 4, wherein the magnet includes a first magnetized portion and a second magnetized portion having a different degree of magnetization from that of the first magnetized portion and the portion in which the magnetic field strength is changed is formed by the magnetized portions.

6. The optical pick-up device according to claim 5, wherein the magnet is uniformly magnetized and a notch or a through hole is formed in the region projecting on the magnet, the notch or the through hole forming the portion in which the magnetic field strength is changed.

* * * * *